United States Patent
Evans et al.

(10) Patent No.: US 9,524,286 B2
(45) Date of Patent: Dec. 20, 2016

(54) PERSISTENT LAYER LABELS FOR A PIVOT TABLE OR CROSS-TABULAR REPORT

(71) Applicant: Oracle International Corporation, Redwood Shores, CA (US)

(72) Inventors: James Evans, Burlington, MA (US); Hendrik van den Broek, Lexington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 661 days.

(21) Appl. No.: 13/693,964

(22) Filed: Dec. 4, 2012

(65) Prior Publication Data

US 2014/0157100 A1 Jun. 5, 2014

(51) Int. Cl.
*G06F 17/24* (2006.01)

(52) U.S. Cl.
CPC .......... *G06F 17/245* (2013.01); *G06F 17/246* (2013.01)

(58) Field of Classification Search
CPC ...... G06F 17/245; G06F 17/246; G06F 17/24; G06F 17/211; G06F 3/0485; G06F 3/04886; G06F 17/30572; G06F 17/30592; G06F 17/30595; G06F 3/04855; G06F 8/38; G06F 9/4435
See application file for complete search history.

(56) References Cited

U.S. PATENT DOCUMENTS

2006/0206800 A1* 9/2006 Agrawal ............... G06F 17/245 715/234
2007/0244672 A1* 10/2007 Kjaer ................... G06F 17/246 703/2
2009/0013244 A1* 1/2009 Cudich ............... G06F 17/2288 715/234
2010/0077326 A1* 3/2010 Verschell .......... G06F 17/30442 715/763
2010/0077344 A1* 3/2010 Gaffney ................ G06F 3/0481 715/788

(Continued)

OTHER PUBLICATIONS

Oracle Fusion Middleware Web User Interface Developer's Guide for Oracle Application Development Framework; 11g Release 2 (11.1.2.2.0) Copyright 2008; 24 pages.

(Continued)

*Primary Examiner* — Stephen Hong
*Assistant Examiner* — Ahamed I Nazar
(74) *Attorney, Agent, or Firm* — Trellis IP Law Group, PC

(57) ABSTRACT

A system and method for facilitating displaying information, including layer labels, in a table or data grid, such as a pivot table or cross-tabular report. An example method includes rendering a first table that includes one or more column headers and one or more row headers, wherein the one or more column headers and the one or more row headers are associated with one or more layers; and persistently displaying one or more labels for the one or more layers. In a more specific embodiment, the first table includes a pivot table with one or more column layers and one or more row layers, which are each associated with the one or more column headers and the one or more row headers, respectively. The example method further includes employing an intersection cell to display layer labels for a row of column headers and for a column of row headers.

11 Claims, 9 Drawing Sheets

(56) References Cited

U.S. PATENT DOCUMENTS

2010/0205521 A1* 8/2010 Folting ................ G06F 17/246
                                                    715/227
2011/0107254 A1* 5/2011 Moroze ................ G06F 17/246
                                                    715/782
2014/0019842 A1* 1/2014 Montagna ............ G06F 17/246
                                                    715/227

OTHER PUBLICATIONS

Oracle Fusion Middleware Fusion Developer's Guide for Oracle Application Development Framework 11g Release 2 (11.1.2.2.0) Copyright 2008; 80 pages.

* cited by examiner

|  |  | Sales | | Units | |
|---|---|---|---|---|---|
|  |  | All Channels | | All Channels | |
|  |  | World | Boston | World | Boston |
| 2007 | Tents | 20,000 | 500 | 200 | 50 |
|  | Canoes | 15,000 | 1,500 | 75 | 8 |
| 2006 | Tents | 10,000 | 250 | 100 | 25 |
|  | Canoes | 7,500 | 750 | 40 | 4 |
| 2005 | Tents | 5,000 | 125 | 50 | 15 |
|  | Canoes | 3,750 | 375 | 20 | 2 |

Show Layer Labels — 58

| | Measure | Sales | | Units | |
|---|---|---|---|---|---|
| | Channel | All Channels | Boston | All Channels | Boston |
| Time | Product : Geography | World | | World | |
| 2007 | Tents | 20,000 | 500 | 200 | 50 |
| | Canoes | 15,000 | 1,500 | 75 | 8 |
| 2006 | Tents | 10,000 | 250 | 100 | 25 |
| | Canoes | 7,500 | 750 | 40 | 4 |
| 2005 | Tents | 5,000 | 125 | 50 | 15 |
| | Canoes | 3,750 | 375 | 20 | 2 |

[ Hide Layer Labels ]—58

FIG. 5

| Measure | | Sales | | | Units | | |
|---|---|---|---|---|---|---|---|
| Channel | | All Channels | | Boston | All Channels | | Boston |
| | Geography | World | Boston | | World | | |
| Time | Product | | | | | | |
| 2007 | Tents | 20,000 | 500 | | 200 | | 50 |
| | Canoes | 15,000 | 1,500 | | 75 | | 8 |
| 2006 | Tents | 10,000 | 250 | | 100 | | 25 |
| | Canoes | 7,500 | 750 | | 40 | | 4 |
| 2005 | Tents | 5,000 | 125 | | 50 | | 15 |
| | Canoes | 3,750 | 375 | | 20 | | 2 |

[Hide Layer Labels] [Export Selected]

FIG. 6

| | | Measure | | | |
|---|---|---|---|---|---|
| | | Sales | | Units | |
| Channel | | All Channels | | All Channels | |
| Time | Product / Geography | World | Boston | World | Boston |
| 2007 | Tents | 20,000 | 500 | 200 | 50 |
| | Canoes | 15,000 | 1,500 | 75 | 8 |
| 2006 | Tents | 10,000 | 250 | 100 | 25 |
| | Canoes | 7,500 | 750 | 40 | 4 |
| 2005 | Tents | 5,000 | 125 | 50 | 15 |
| | Canoes | 3,750 | 375 | 20 | 2 |

Hide Layer Labels

FIG. 7

| Measure | Sales | | | | |
|---|---|---|---|---|---|
| Time | 2007 | | 2006 | | |
| Channel | All Channels | | All Channels | | |
| Geography | World | Boston | World | Boston | |
| Product | | | | | |
| Tents | 20,000 | 500 | 10,000 | 250 | |
| Canoes | 15,000 | 1,500 | 7,500 | 750 | |

[Hide Layer Labels]

FIG. 8

PERSISTENT LAYER LABELS FOR A PIVOT TABLE OR CROSS-TABULAR REPORT

BACKGROUND

The present application relates to software and more specifically to software and accompanying graphical user interfaces for facilitating viewing information in tables or data grids, such as pivot tables or cross-tabular reports.

Tables, also called data grids, are employed in various demanding applications, including spreadsheets, databases, enterprise network pages, webpages, and so on. Such applications often demand feature rich tables and accompanying user interface controls for adjusting how data and what data is displayed in the tables and for rapidly conveying information about data summarized in a table.

A pivot table or cross-tabular report may provide functionality for rearranging data in a table, e.g., by enabling user repositioning of rows or columns or other portions of a table identified by row or column headers.

A pivot table may have hierarchically arranged headers at edges of the pivot table. Conventionally, an upper edge of a pivot table often displays column headers, while the left or right edge of a pivot table may display row headers. Each level in a header hierarchy may represent a layer, and each layer may have sub-layers, e.g., corresponding to one or more column or row headers. Accordingly, layers often correspond to data in a row or column or groups thereof.

Headers and accompanying data can be ambiguous. For example, a header or sub-header may not necessarily convey information pertaining to the type of data contained in the header or in the sub-header. The type of data in a header or sub-header may be identified by a label, often called a layer label.

Conventionally, layer labels are not shown, due to table display constraints, and when layer labels are obvious in view of the header and row labels. For example, headers that include names of various cars may obviously represent automobiles. However, often the type of data represented by a header may not be obvious, yet this information may be important for data analysis.

Accordingly, layer labels, when displayed, are temporarily individually displayed via a hover layer that appears upon mouse-over of a header field. Hence, such layer labels are typically hidden. However, this can be problematic for data analysis that requires rapid visual understanding of data presented in a pivot table.

SUMMARY

An example method facilitates displaying information, including layer labels, in a table or data grid, such as a pivot table or cross-tabular report. The example method includes rendering a first table that includes one or more column headers and one or more row headers, wherein the one or more column headers and the one or more row headers are associated with one or more layers; and persistently displaying one or more labels for the one or more layers.

In a more specific embodiment, the first table is a pivot table with one or more column layers and one or more row layers, which are each associated with the one or more column headers and the one or more row headers, respectively. The method further includes employing an intersection cell, during a so-called intersection cell mode, to display layer labels for a row of column headers and for a column of row headers. The intersection cell is positioned at a corner region of the pivot table at a junction between the row of column headers and the column of row headers.

In the specific embodiment, the pivot table includes plural nested column headers in an upper or lower edge region of the pivot table. The plural nested column headers are hierarchically arranged in header rows, wherein each header row represents a column layer. The pivot table further includes a column layer label cell that is horizontally adjacent to each of the header rows. During intersection cell mode, each column layer label cell may include a layer label for each column layer. The intersection cell acts as both a column layer label cell and a row layer label cell.

During a so-called blank cell mode, the pivot table further includes a column in the pivot table that accommodates each column layer label cell and that further includes blank cells horizontally adjacent to a column of row headers. The example method further includes implementing each of the blank cells as a selection handle to facilitate selecting one or more cells of the pivot table, such as a row of a table data body.

The pivot table further includes plural nested row headers in a leftmost or rightmost edge region of a table. The plural nested row headers are hierarchically arranged in header columns, wherein each header column represents a row layer. A row layer label cell is vertically adjacent to each of the header columns. During an intersection cell mode, each row layer label cell may include a layer label for each row layer.

During the blank cell mode, the pivot table includes a row in the pivot table that accommodates each row layer label cell and that further includes blank cells vertically adjacent to a row of column headers. Each of the blank cells may be implemented as a selection handle to select one or more cells of the pivot table, such as a column of cells of a table data body. A cell at an intersection of a row layer label cell and a column layer label cell may act as a selection handle to select all contents of a data body of the pivot table.

The example method further includes providing various user options, e.g., via one or more user interface controls, including a first user option to selectively enable or disable display of one or more layer labels; a second user option to selectively enable display of one or more layer labels via an intersection cell or via use of one or more columns or one or more rows with one or more blank cells and one or more cells that include one or more layer labels; a third user option to add a stamp to one or more layer label cells; a fourth user option to enable or disable display of a hover layer that includes a layer label and a pivot handle in addition to display of persistent layer labels; and a fifth user option to scroll a header region to display additional layer labels that may not be initially visible in a table.

The example method may further include various additional steps, such as automatically adjusting a size of one or more layer label cells when one or more columns or rows of the table are resized, so as to ensure that contents of a layer label cell remain visible and not clipped.

Accordingly, various embodiments discussed herein provide efficient, uncluttered, and space efficient mechanisms for selectively displaying layer labels in a pivot table or other data grid.

A further understanding of the nature and the advantages of particular embodiments disclosed herein may be realized by reference of the remaining portions of the specification and the attached drawings.

BRIEF DESCRIPTION OF THE DRAWINGS

FIG. 2 is a diagram illustrating a first example table with a user interface control for selectively displaying table layer labels.

FIG. 5 is a diagram illustrating the example table of FIG. 3 after a side-by-side sub-mode of the intersection cell mode has been enabled.

FIG. 6 is a diagram illustrating the example table of FIG. 3 after a user has enabled blank cell mode to display layer labels.

FIG. 7 is a diagram illustrating the example table of FIG. 6 after a user has selected a row header to perform a pivot operation, resulting in display of a layer label via a hover layer with a pivot handle.

FIG. 8 is a diagram illustrating the table of FIG. 7 after a user has completed an example pivot operation and has applied a stamp to a layer label.

DETAILED DESCRIPTION OF EMBODIMENTS

Figure 1:
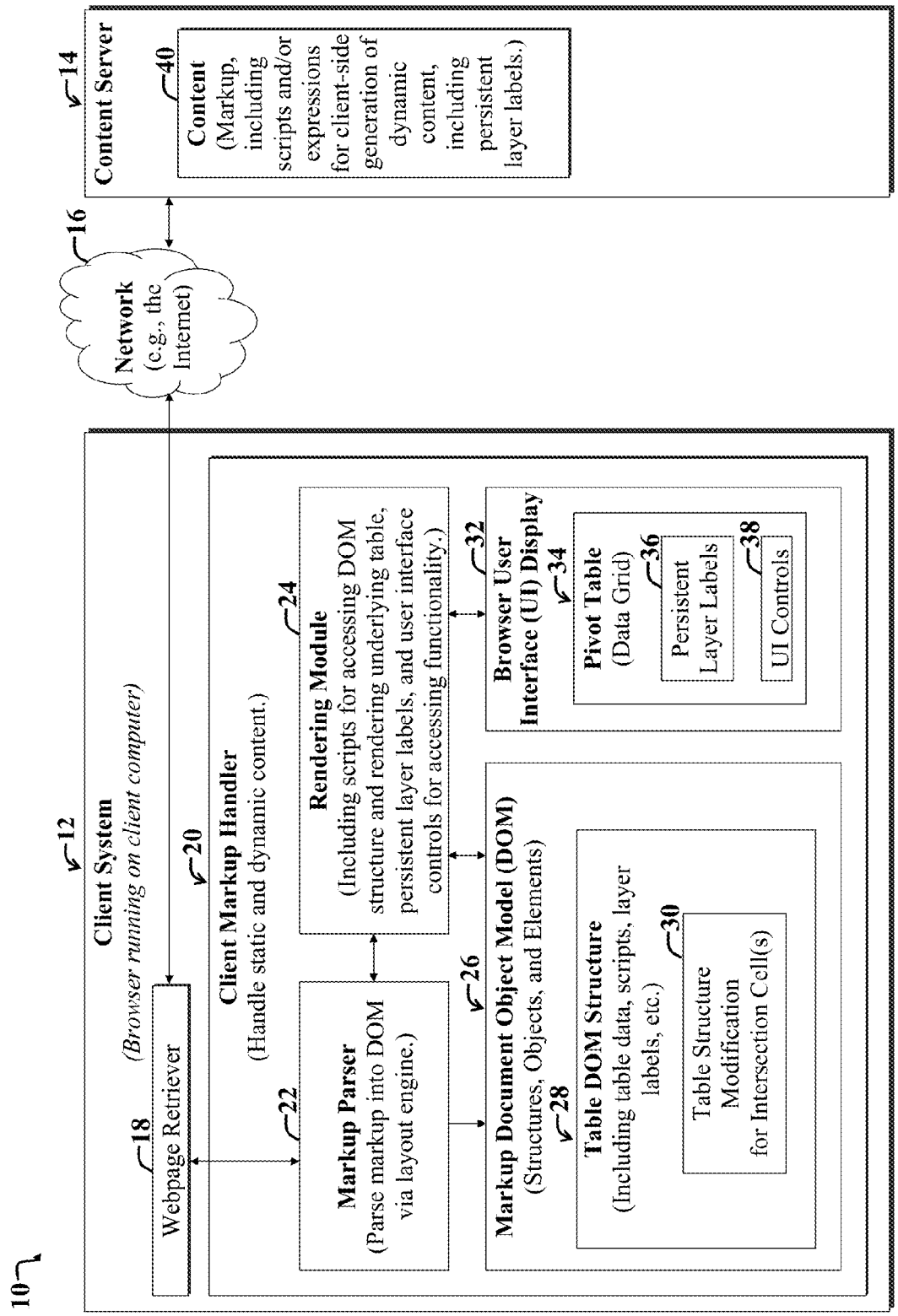
FIG. 1 is a diagram illustrating a first example system for accessing and displaying data in a web-based pivot table with persistent layer label functionality.

For the purposes of the present discussion, a table displayed via a webpage or otherwise included in webpage markup is called a web-based table or a web-based data grid. A data grid may be any organization of data into one or more columns or rows and may include accompanying user interface controls, such as scroll bars, headers, Query By Example (QBE) elements, and so on, for adjusting data displayed in the one or more columns or rows. The terms "data grid" and "table" may be employed interchangeably herein.

Note however, that data grids and tables are not limited to conventional HyperText Markup Language (HTML) tables specified via HTML table tags. For example, data grids and tables discussed herein may include dynamically generated structures and content. For the purposes of the present discussion, dynamic content may be any content that includes output from a script. Content may be any resource, which may include data and/or functionality, such as a web page, file, streaming audio and/or video, and so on.

A pivot table may be any table that is adapted to enable user repositioning or rearrangement of row headers and/or column headers and accompanying data. For example, in certain applications, a row header may be dragged to an upper edge of the pivot table, resulting in automatic rearrangement of headers and fields represented by the table. Furthermore, a column header of an upper table edge may be dragged to a side edge of the pivot table to cause automatic rearrangement and repositioning and/or sorting of data presented via the pivot table. Accordingly, a cross-tabular report may represent a type of pivot table.

A script may be any computer program, or component, function, or procedure thereof adapted to perform one or more tasks. A content-producing script may be any script that is adapted to output content, such as a data grid. For example, a script (e.g., a JavaScript document.write( . . . ) script) that outputs content (e.g., markup) that includes one or more data grids, represents a type of content-producing script, also called a data grid generating script. Similarly, a script that includes one or more function calls to a content-producing script is also is considered to be a content-producing script.

Certain scripts may be executed via a browser, which may run on a computer (called a client computer) that is separate from a content server that hosts content that includes the script. Such a browser is called a client browser. A client browser may be any browser software running on a client computer or system. A browser may be any software adapted to access and/or traverse content available via a computer network, such as an enterprise network and/or the World Wide Web. A client may be any computer or system that is adapted to receive content from another computer or system, called a server.

A server may be any computing resource, such as a computer and/or software that is adapted to provide content to another computing resource or entity that requests it, i.e., the client. A content server may be any server that is adapted to provide a resource, e.g., data or functionality, to a client.

For clarity, certain well-known components, such as hard drives, processors, operating systems, power supplies, Internet Service Providers (ISPs), and so on, have been omitted from the figures. However, those skilled in the art with access to the present teachings will know which components to implement and how to implement them to meet the needs of a given implementation.

FIG. 1 is a diagram illustrating a first example system 10 for accessing and displaying data in a web-based pivot table 34 with persistent layer label functionality. The example system 10 includes a client system 12 in communication with a content server 14 via a network 16, such as the Internet. The client system 12 may be implemented via a browser running on a client computer, such as a desktop or mobile device.

The client system 12 includes a webpage retriever 18, which is adapted to selectively retrieve content 40 from the content server, such as in response to a browser request. A client markup handler 20 communicates with the webpage retriever 18, and includes a markup parser 22 in communication with a rendering module 24 and a markup Document Object Model (DOM) 26. The markup DOM 26 is accessible via the rendering module 24 and includes a table DOM structure 28. The table DOM structure 28 includes table structure modifications 30 to accommodate construction of intersection cells to display layer labels, as discussed more fully below. Those skilled in the art with access to the present teachings may readily determine appropriate modifications to the table DOM structure 28 needed to meet the needs of a given implementation.

Content retrieved by the webpage retriever 18 is parsed by the markup parser 22 and selectively fed to the markup DOM 26 and rendering module 24. The rendering module 24 includes data and scripts for accessing the DOM structure 28 and rendering a pivot table 34 specified via the retrieved content 40. The data and scripts are adapted to enable rendering the pivot table 34 with persistent layer labels and user interface controls for accessing script-based functionality associated with the pivot table 34.

A browser user interface display 32 is employed to display the pivot table 34 with selectively displayed persistent layer labels 36 and accompanying user interface controls 38 in response to rendering instructions obtained from the rendering module 24.

In the present example embodiment, the pivot table 34 may be displayed in various modes, as supported by downloaded and parsed scripts supported by the rendering module 24. The user interface controls 38 include controls for enabling changing of display modes. Example modes include persistent layer label display mode and persistent layer label off mode. Example sub-modes of the persistent layer label display mode include an intersection cell mode and a blank cell mode.

During intersection cell mode, an intersection cell is employed to facilitate display of layer labels. During blank cell mode, one or more blank columns and rows are added to the pivot table 34 to facilitate displaying layer labels, as discussed more fully below.

Note that while the system 10 of FIG. 1 is adapted for use with client-side implementation and rendering of the pivot table 34, that other implementations, such as server-side implementations, are possible. Furthermore, while a browser user interface display 32 is employed to display a pivot table, that other types of applications (other than browsers) may employ layer labels as discussed herein, without departing from the scope of the present teachings.

Hence, multiple code paths may be employed to handle the different modes during server-side or client-side rendering, including handling layer label size coordination with other table cells or elements, element positioning, scroll handling, and user resizing operations. Sizing algorithms may be implemented via proportional sizing logic. Scroll handling logic supports scrolling of layer labels with scrollable headers. User resizing logic supports keeping layer labels aligned with other table layers as a user resizes one or more columns, cells, rows, or layers. Stamping logic may support adding one or more stamps to a layer label or other table field, header, or element, as discussed more fully below. Such logic may be implemented via scripts retrieved from the content server 14.

FIG. 2 is a diagram illustrating a first example pivot table 50 with a user interface control 58 for selectively displaying table layer labels, i.e., for enabling or disabling persistent layer label mode. Currently, the table 50 does not illustrate table layers, i.e., persistent layer label mode is off. The user interface control 58, which may be a button or other control, may act as a toggle for displaying persistent layer labels, i.e., for enabling or disabling persistent layer label mode.

For the purposes of the present discussion, a user interface control may be any user interface feature that is adapted to enable a user to trigger or otherwise use functionality associated with or provided by the user interface. Accordingly, examples of user interface controls include hyperlinks, buttons, menu items in drop-down menus, search fields, sorting controls, data filtering controls, and so on.

The pivot table 50 includes a column header section 54 and a row header section 52 (also called edge sections), which include nested headers, also called hierarchically arranged headers, i.e., headers arranged in a hierarchy. A pivot table data body 56 includes various table cells, contents of which are arranged in accordance with the arrangement of headers in the column header section 54 and the row header section 52.

For the purposes of the present discussion, a data body of a table may be a collection of one or more cells of a table that are not header cells. Data body cells may include one or more measures, data values, stamps, and so on, which are displayed in cells of a table.

A header may be any field or label therein identifying or labeling data in a corresponding row or column. Accordingly, a column header may represent a title representative of or otherwise associated with data in a column that includes the column header. Similarly, a row header may represent a title associated with data in a row that includes the row header. A group of headers in a similar row of headers are said to represent a layer of data. Each individual header may represent a sub-layer of the layer.

Column headers are typically positioned at a top edge of a table. Row headers are typically positioned at a leftmost or rightmost edge of a table. An edge region (also called edge region or section) of a table may be any collection of cells near a boundary of a table. For example, column headers and row headers discussed herein are included in upper table edge regions and left table edge regions corresponding to the column header section 54 and the row header section 52, respectively.

For the purposes of the present discussion, a hierarchy may be any arrangement of objects, e.g., header cells or fields, where the objects exhibit superior or subordinate relationships with other objects. An object may be any collection of or quanta of data and/or functionality. A hierarchy may refer to a displayed representation of data items or other objects or may refer to data and accompanying relationships existing irrespective of the representation.

The example column header section 54 includes three layers of headers, including primary headers of Sales and Units, which have sub-headers of All Channels, which have sub-headers of World and Boston. The sub-headers World and Boston are said to be nested within the All Channels headers, which are nested within the Sales header and Units header. Each row of the header section 54 represents a column layer, which can be labeled, as discussed more fully below.

Similarly, the row header section 52 includes nested headers, including headers of Tents and Canoes, which are nested with headers for years 2005-2007. Each column of the row header section 52 represents a row layer, which can be labeled, as discussed more fully below.

Hierarchically arranged headers are said to represented nested rows or columns, since a column corresponding to a superior header may include multiple columns corresponding to subordinate headers, i.e., sub-headers. As set forth above, each level of a header hierarchy represents a layer, and a layer may include sub-layers, e.g., identified by individual headers.

Accordingly, a pivot table may display multiple nested attributes via row and column headers. Certain pivot tables may display data in a grid layout, i.e., data grid, with unlimited layers of nested rows and columns.

Similar to spreadsheets, certain pivot tables may provide options for automatically generating subtotals and totals for grid data. Certain pivot tables may incorporate functionality for enabling users to change the layout of attributes using drag-and-drop operations, such as by pivoting or reposition data labels and the associated data layer from one location on the row or column edge to another to obtain different views of your data, supporting interactive analysis.

Figure 3:
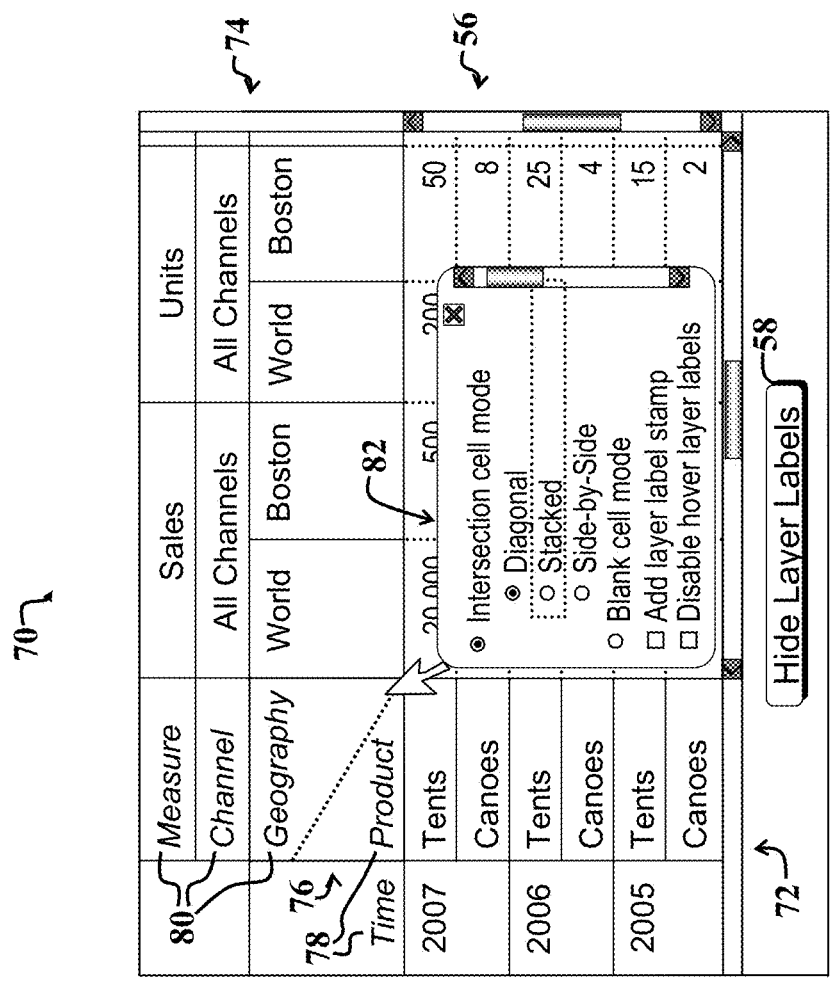
FIG. 3 is a diagram illustrating the example table of FIG. 2 after a user has enabled display of layer labels, which are displayed via use of an intersection cell in a diagonal mode.

FIG. 3 is a diagram illustrating the example table of FIG. 2 after a user has enabled display of layer labels, which are displayed via use of an intersection cell 76 at a corner region of the data body 56. A corner region of a data body may be any cell or group of cells adjacent to a corner of a data body.

The resulting pivot table 70 is said to be in persistent layer label mode, since column layer labels 80 and row layer labels 78 are persistently displayed in the pivot table 70. A user may selected the user interface control 58 of FIG. 2 to toggle display of the persistent layer labels 78, 80, i.e., to enable or activate persistent layer label mode.

The column layer labels 80 are displayed via a column of layer label cells that are horizontally adjacent to the nested headers of an updated column header section 74, where the column of layer label cells terminates at the intersection cell 76. Similarly, the row layer labels 78 are displayed via a row of layer label cells that terminates at the intersection cell 76.

For the purposes of the present discussion, a layer label cell may be any cell of a table that includes a label associated with or otherwise identifying a layer. A layer label may indicate a type of data associated with various headers of a layer. For example, a group of headers pertaining to different cities or other regions may be identified by a layer label called Geography. Accordingly, a column layer label cell is used to accommodate a layer label (called a column layer label) for column headers. Similarly, a row layer label cell accommodates a layer label (called a row layer label) for row headers.

An intersection cell, such as the intersection cell 76, may be any cell of a table that includes multiple sections that may contain data, such as layer labels. In the present specific embodiment, the intersection cell 76 is divided into two sections by a diagonal separator (which may or may not be visibly displayed), such that a first section above the diagonal accommodates a first layer label, i.e., a column layer label called Geography, and a second section below the diagonal accommodates a second layer label, i.e., a row layer label called Product. The Geography layer label is a label or title indicative of the type of data in the layer represented by the header row (of the column header section 74) that includes World and Boston headers. Similarly, the Product layer label is a label or title indicative of the type of data in the layer represented by the header column (of the row header section 72) that includes Tents and Canoes.

When the intersection cell 76 employs a diagonal separator to separate column and row layer label sections, the pivot table 70 is said to be in a diagonal sub-mode of the intersection cell sub-mode of the persistent layer label mode. Note that in practice, the diagonal separator may be hidden, i.e., not shown. In the present specific embodiment, during diagonal mode, the width and height of the column and row, respectively, of the intersection cell 76, are automatically adjusted to accommodate text of the accompanying layer labels, thereby avoiding clipping of layer label text. Note that the layer labels and the accompanying diagonal separator of the intersection cell 76 may be reoriented or otherwise adjusted, e.g., resulting in a stacked mode or a side-by-side mode, as discussed more fully below with reference to FIGS. 4-5.

For the purposes of the present discussion, a layer label may be any title or term used to categorize one or more headers of a layer. Hence, a layer label need not be indicative of a type of data represented by headers of a layer, but may include any name as may be suitable for a given implementation.

A label, such as a layer label, is said to be persistently displayed if the layer label remains visible in or in proximity to a table until disabled or otherwise removed, e.g., via a user interface control (e.g., a toggle button) or other mechanism. Generally, persistent display of a layer label enables simultaneous display of plural layer labels.

In the present specific embodiment, persistent layer labels are included in cells of a table. A layer label that is temporarily displayed upon mouse over of a header and disappears when the mouse cursor is moved off of a header or outside of a table boundary or when a user has finished using an accompanying control (e.g., a pivot handle) is not considered to be persistently displayed.

In the present example embodiment, the table 70 displays layer labels in an intersection cell sub-mode of the persistent layer label mode. This mode may be changed via one or more user interface controls, such as via a right-click menu 82, which may appear upon employing a computer mouse to right click a layer label or layer label cell. Note that mechanisms for activating menus (or display of other user interface control(s)) other than right-clicking may be employed. For example, double-clicking in a layer label cell or other table cell may trigger display of one or more menus or other user interface controls for performing certain functions, such as editing cell contents, adding stamps, and so on.

In the example embodiment of FIG. 3, the menu 82 includes user options for enabling or disabling, i.e., choosing between intersection cell mode (and accompanying sub-modes, i.e., diagonal, stacked, or side-by-side) or blank cell mode, which are sub-modes of the persistent layer label mode. A user option for adding a layer label stamp is also provided, e.g., via a check box selection mechanism. An additional user option for disabling display of hover layer labels while in persistent layer label mode is also provided.

If a user employs the menu 82 to select blank cell mode, then the layer labels 78, 80 will be displayed via a mechanism other than an intersection cell, as discussed more fully below with reference to FIG. 6.

If a user employs the menu 82 to facilitate adding a layer label stamp, then after the menu 82 is closed, another user interface screen may appear with user interface controls an accompanying options for enabling a user to choose what stamp to apply to a selected cell. An example of layer label cell stamping is discussed more fully below with reference to FIG. 8.

Various formatting or user interface subtleties may be applied to the layer labels 78, 80 to visually distinguish layer labels from other table elements and to facilitate user interpretation of displayed information. Examples of special formatting include different vertical and/or horizontal text alignment, appropriate minimum padding space between layer labels in the intersection cell 76, distinguished font color, font type and sizing adjustments, and horizontal or vertical padding between layer labels.

A sizing algorithm may be applied to the layer labels 78, 80 and/or accompanying table cells used to display the layer labels 78, 80. The algorithm may set row heights and column widths according to cell contents of layer label cells so that resizing of columns or rows of the table 70 result in proportional resizing of the accompanying layer label cells, including the intersection cell 76. This may ensure that the layer labels are not clipped by default.

If a row header layer label (e.g., the Time layer label) is longer than the members of that layer (e.g., the sub-layer represented by the row 2007 row header), or if a column header layer label (e.g., the Measure layer label) is taller than the members of that layer (e.g., the sub-layer represented by the Sales header), then the column width or row height is set to accommodate the layer label, rather than clipping its contents. This may be especially useful for the column containing the intersection cell 76, since its contents (e.g., the Product and Geography layer labels are in one cell, i.e., the intersection cell 76) are often longer than the members in that column (e.g., the Tents header). Note that if the sizing algorithm only took into account the widths of the members, the layer labels could be clipped.

The sizing algorithm may employ proportional sizing, so that as the column containing the intersection cell is resized, the longer label (e.g., Geography) continues to be granted proportionally more of the cell than the shorter label (e.g., Product). Thus, if the Product layer label, including its minimal padding, requires a minimum width of m pixels to display fully, and the Geography layer label, including its minimal padding, requires a minimum width of n pixels to display fully, then as the column is resized, the m/n ratio is maintained. This is useful if the user (or application) makes the column containing the intersection cell 76 narrower.

In certain implementations, when the intersection cell 76 and accompanying column is sufficiently narrowed, the user may see abbreviations, e.g., "Prod . . . " and "Geogr . . . ", so that there is still some indication of what both labels are. Without such a sizing algorithm, such column narrowing may result in a layer label being substantially clipped, e.g., where all of the lost space is taken away from one label so that there is no indication as to its value.

The proportional sizing may also be useful when the column is made wider. In this case, the continued proportionality may be more aesthetically pleasing than the alternative. In summary, when a user resizes a layer or sub-layer (e.g., a column) in a row header, or a layer or sub-layer (e.g., row) in the column header, then the corresponding persistent layer label is also resized to ensure that the layer label is always aligned as desired with its corresponding layer.

Figure 4:
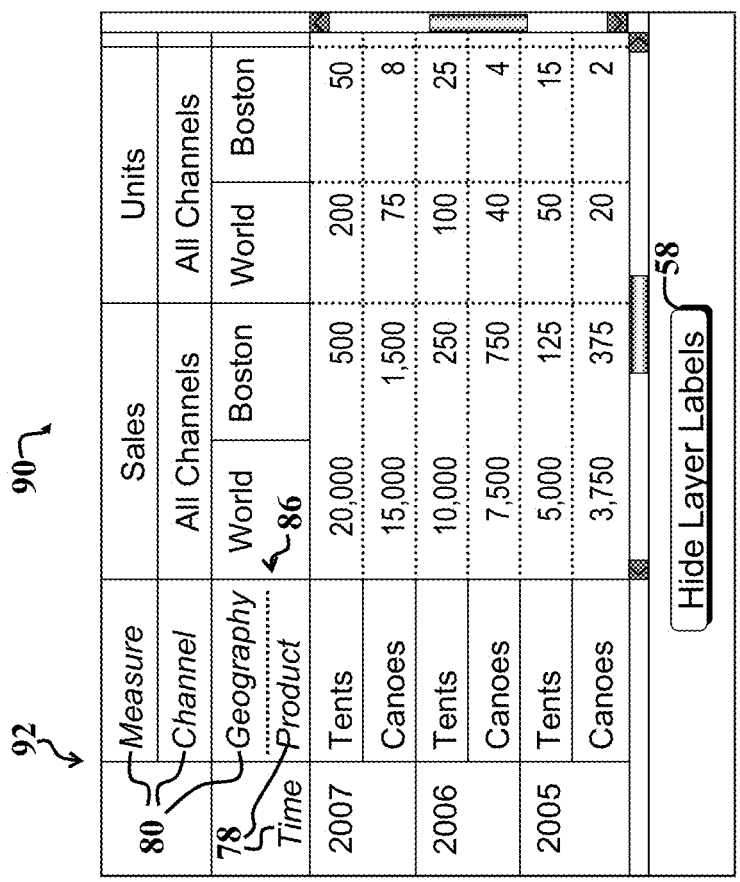
FIG. 4 is a diagram illustrating the example table of FIG. 3 after a stacked sub-mode of the intersection cell mode has been enabled.

FIG. 4 is a diagram illustrating the example table 70 of FIG. 3 after a stacked sub-mode of the intersection cell mode has been enabled, resulting in an updated pivot table 90. The updated pivot table 90 is similar to the pivot table 70 of FIG. 3 with the exception that the diagonal separator of the intersection cell 76 has been reoriented horizontally, resulting in repositioning of the accompanying layer labels, as shown in an updated intersection cell 86 of FIG. 4, and further resulting in resizing of a column (Product column) and row (Geography row) that accommodate the updated intersection cell 86.

In certain implementations, depending in part upon the relative sizes of the layer labels (e.g., Geography and Product), during stacked mode, use of the intersection cell 86 shown in FIG. 4 will result in increased height of the accompanying row (Geography row) and reduced width of the accompanying column (Product column) relative to the corresponding row and column displayed in diagonal mode (as shown in the pivot table 70 of FIG. 3).

FIG. 5 is a diagram illustrating the example table 70 of FIG. 3 after a side-by-side sub-mode of the intersection cell mode has been enabled, resulting in another updated pivot table 100. The updated pivot table 100 is similar to the pivot table 70 of FIG. 3 with the exception that the diagonal separator of the intersection cell 76 has been reoriented vertically, resulting in repositioning of the accompanying layer labels, as shown in an updated intersection cell 106 of FIG. 5, and further resulting in resizing of a column (Product column) and row (Geography row) that accommodate the updated intersection cell 106.

In certain implementations, depending in part upon the relative sizes of the layer labels (e.g., Geography and Product), during side-by-side mode, use of the intersection cell 106 shown in FIG. 5 will result in reduced height of the accompanying row (Geography row) and increased width of the accompanying column (Product column) relative to the corresponding row and column displayed in diagonal mode (as shown in the pivot table 70 of FIG. 3).

In summary, adjustments in layer label orientation in the intersection cell 76 of FIG. 3 may result in different adjustments to the height and width of the accompanying row and column, respectively. During a stacked mode, which may employ a horizontal separator (as opposed to a diagonal separator) in the intersection cell 86 of FIG. 4, relatively more space may be allocated for the accompanying row, whereas during a side-by-side mode, relatively more space may be allocated for the accompanying column.

Note that other orientations of layer labels in an intersection cell are possible. For example, text may be oriented vertically, and a separator boundary may have varying degrees of tilt (other than those shown) without departing from the scope of the present teachings.

FIG. 6 is a diagram illustrating the example table of FIG. 3 after a user has enabled blank cell mode to display layer labels, resulting in display of an updated table 110. The updated table 110 employs a layer label column 96 that extends the length of the table 110 to display column layer labels. Similarly, a layer label row 98, which extends the width of the table 110, is employed to display row layer labels. The layer label column 96 and the layer label row 98 each include blank cells.

The column of layer labels 96 includes blank cells positioned horizontally adjacent to a right most row of row headers of an updated row header section 92. Similarly, the label layer row 98 includes a row of blank cells positioned vertically adjacent to the bottom row of column header labels of the column header section 94.

While the layer label column 96 and row 98 include so-called blank cells, since no data is shown in the cells, certain functionality may be assigned to the blank cells so that they act as user interface controls. For example, in the present specific embodiment, user selection of one of the blank cells of the layer label column 96 results in selection of all data body cells of a corresponding row. For example, in FIG. 6, a data body row 112 has been selected by employing a mouse to click on a blank cell of the layer label column 96 adjacent to the Canoes sub-header of the 2007 row header. Similarly, user selection of a blank cell in the layer label row 98 may result in selection of a data body column.

A corner cell at the intersection of the label layer row 98 and the layer label column 96 may be adapted to cause selection of the entire data body of the table 110, i.e., all cells between the column header section 94 and the row header section 92. Blank cells of the layer label column 96 and row 98 are said to act as selection handles.

For the purposes of the present discussion, a selection handle may be any user interface control or feature that is adapted to enable or otherwise facilitate user selection of plural cells of a table. Note that other functionality other than data selection or table cell selection may be assigned to blank cells, without departing from the scope of the present teachings.

Furthermore, user interface controls other than the persistent layer label mode toggle button 58 may be included. For illustrative purposes, an export button 108 appears after data cells of the row 112 are selected. Selection of the export selected button 108 may trigger display of another user interface display screen with options for exporting selected data to a different file or format.

In certain implementations, additional functionality may be associated with layer labels, to facilitate user interactivity with the layer labels. In such cases, scripts used to generate the pivot table 110 may be coded to enable individual or simultaneous selection of layer labels.

The extension of the selection feature to layer labels may involve supporting selecting layer labels via click (to support selection of one label), Shift-click or click-and-drag (to support selecting a range of cells), and Ctrl-click (to support discontiguous selection). The keyboard selection user interface functionality may support selecting layer labels by navigating to them using the arrow keys, and using Shiftarrow to select a range. Ctrl-arrow may trigger jumping from a header cell to the nearest layer label, and from a layer label to the nearest header cell.

FIG. 7 is a diagram illustrating the example table of FIG. 6 after a user has selected a row header to perform a pivot operation, resulting in display of an updated table 130. The updated table 130 includes an example layer label, called Time, which is displayed via a hover layer with a pivot handle 116.

For the purposes of the present discussion, a pivot handle may be any user interface control or feature that is adapted to facilitate dragging or otherwise repositioning one or more columns, rows, or collections of columns or rows, e.g., layers, in a table so as to implement a pivot operation.

In the present example embodiment, a user employs a mouse to click and drag a header, e.g., one of the 2007, 2006, or 2005 headers, resulting in display of the Time layer label in the hover layer and pivot handle 116. A user employs the hover layer and pivot handle 116 to implement a pivot, which in this case, involves repositioning the Time layer between a Measure layer and a Channel layer of the column header section 114. This pivoting action results in an automatic rearrangement of cells of the table 130, as discussed more fully below with reference to FIG. 8.

FIG. 8 is a diagram illustrating the table of FIG. 7 after a user has completed an example pivot operation and has applied a stamp 126 to a layer label, resulting in display of an updated pivot table 140. The pivot table 140 includes an updated row header section 122 and an updated column header section 124.

The column header section 124 has been augmented with a Time layer, which has been removed from the row header section 122. For illustrative purposes, the table 140 is displayed with a space constraint, resulting in a header section scroll bar 128 appearing adjacent to the column header section 124.

The header section scroll bar 128 enables scrolling of headers and accompanying column layer labels in the column header section 124. Accordingly, displayed layer labels are adapted to scroll along with headers displayed in a header section.

In summary, in persistent layer label mode, header regions may be scrollable as needed. When a row or column header section has more layers than will fit in available screen real estate, the header may automatically gain a scrollbar to enable display of the remaining layers.

A row header section may gain a horizontal scrollbar if needed, and a column header section may gain a vertical scrollbar if needed. A scroll listener may detect when a user scrolls a header section, and then programmatically scroll the layer labels in unison, so that the layer labels are always appropriately aligned with their corresponding layers.

In the present specific embodiment, if a header section is adjusted for scrolling of the header section, then persistent layer label mode may automatically switch from intersection cell mode to blank cell mode (if not already in blank cell mode) to facilitate synchronization between scrolling of layer labels and accompanying layers.

In FIG. 8, a user has employed a user interface control, such as the menu 82 of FIG. 3, to apply the example stamp 126 to an example layer label, e.g., the Time layer label. For the purposes of the present discussion, a stamp may be any content added to a cell, where the content may include data and/or one or more user interface controls. Examples of stamps include icons, symbols, graphs or other visualizations, drop-down menus, buttons, hyperlinks or image maps, and so on.

In summary, underlying computer code, e.g., scripts, are adapted to allow applications to stamp arbitrary content in the layer label, such as icons, links, formatted text, or even input controls. The computer code may support a <layer> HyperText Markup Language (HTML) tag, as a child tag of a <pivotTable> tag. Contents of the <layer> tag may be stamped out for each layer label. As with data cell stamping, Expression Language (EL) may be used to access currency data, such as layer label text.

Figure 9:
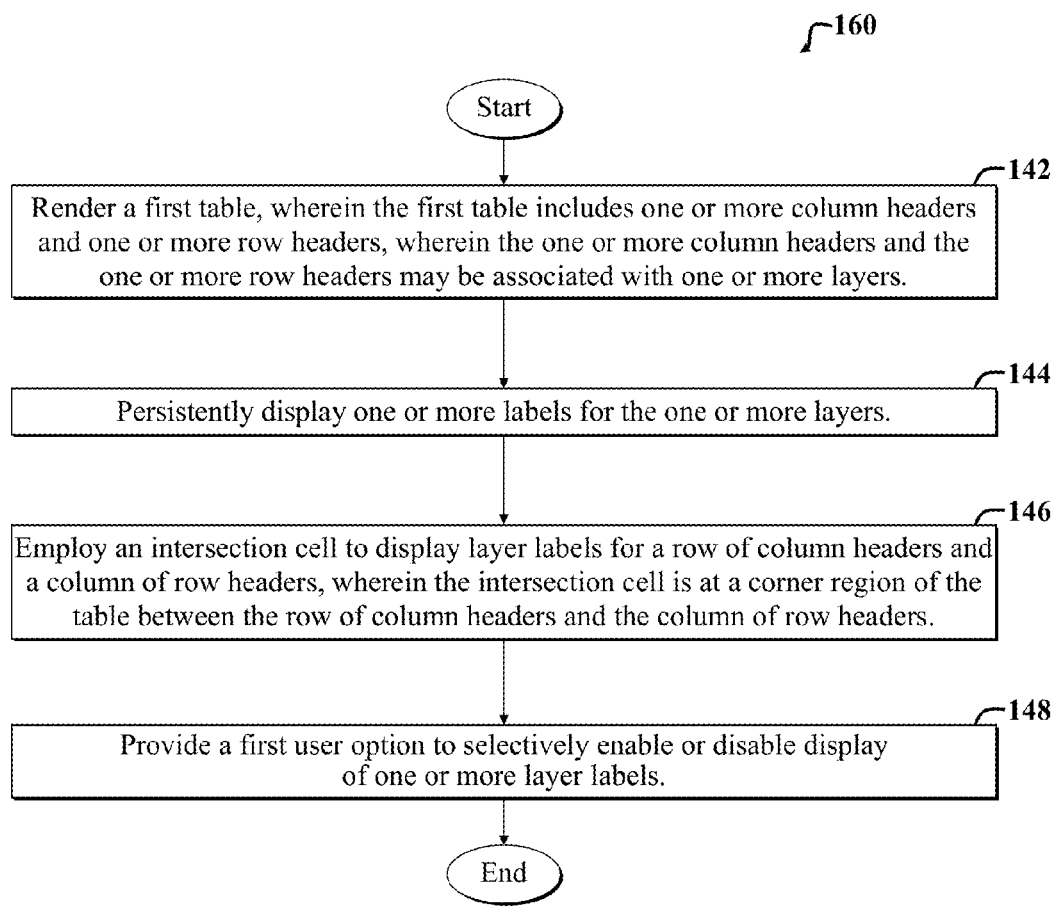
FIG. 9 is a flow diagram of an example method, which is adapted for use with the embodiments of FIGS. 1-8.

FIG. 9 is a flow diagram of an example method 160, which is adapted for use with the embodiments of FIGS. 1-8. The example method 160 includes a first step 142, which involves rendering a first table, wherein the first table includes one or more column headers and one or more row headers, wherein the one or more column headers and the one or more row headers may be associated with one or more layers.

A second step 144 includes persistently displaying one or more labels for the one or more layers.

A third step 146 includes employing an intersection cell to display layer labels for a row of column headers and a column of row headers, wherein the intersection cell is positioned at a corner region of the table between the row of column headers and the column of row headers.

A fourth step 148 includes providing a first user option to selectively enable or disable display of one or more layer labels.

Note that various steps of the method 160 may be rearranged, augmented, removed, or replaced with other steps, without departing from the scope of the present teachings. For example, the method 160 may be modified to include providing various additional user options, such as a user option to selectively enable display of one or more layer labels via an intersection cell or via use of one or more columns or one or more rows with one or more blank cells and one or more cells that include one or more layer labels; a user option to add a stamp to one or more layer label cells; a user option to enable or disable display of a hover layer that includes a layer label and a pivot handle in addition to display of persistent layer labels; a user option to scroll a header region to display additional layer labels that may not be initially visible in a table, and so on.

An additional example step, which may be added to the method 160, includes automatically adjusting a size of one or more layer label cells when one or more columns or rows of the table are resized, so as to ensure that contents of a layer label cell remain visible and not clipped.

Although the description has been described with respect to particular embodiments thereof, these particular embodiments are merely illustrative, and not restrictive. For example, while the present description is discussed with respect to providing persistent layer label functionality for pivot tables, that such layer label functionality and accompanying methods may be adapted to visualizations other than pivot tables, such as sunburst visualizations, pie charts, and so on.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method, performed by a computer system, for displaying and interacting with information in a pivot table, the method comprising:
rendering, by the computer system, a pivot table, wherein the pivot table includes a data table of rows and columns of data cells and with the data table including a topmost row and a leftmost column;
rendering, by the computer system, one or more column header rows at a top edge of the data table with a first column header row located adjacent to the topmost row of the data table;
rendering, by the computer system, one or more row header columns at a left edge of the data table with a first row header column located adjacent to a leftmost column of the data table, wherein the one or more column header rows and the one or more row header columns are associated with one or more layers;
enabling, in response to label display enable input signals to a hide layer label user interface, persistent display of layer labels,
persistently displaying, by the computer system and in response to label display enable input signals, a layer label column, wherein the layer label column includes layer column cells, displaced horizontally left of and adjacent to an associated column header row, wherein a layer column cell identifies a data type of the associated column header row;
persistently displaying, by the computer system and in response to label display enable input signals, a layer label row, wherein the layer label row includes layer row cells, displaced vertically from and adjacent to an associated row header column, wherein a layer row cell identifies a data type of the associated row header column;
enabling, in response to intersection cell enable signals from a user interface, display of an intersection cell;
persistently displaying, by the computer and in response to intersection cell enable signals, a single intersection cell that is the both the layer column cell displaced left of and adjacent to the first column header row and the layer row cell displaced vertically from and adjacent to the first row header column, where the intersection cell includes a first section that identifies the data type of the first column header row and a second section that identifies the data type of the first row header column;
displaying, by the computer and when no intersection enable signal is received from the user interface, a layer label row having blank cells displaced vertically from and adjacent to the topmost row and a layer label column having blank cells displaced horizontally left of and adjacent to the leftmost column;
enabling, by the computer and in response selection of a blank cell, data cell selection functionality;
creating, by the computer system and in response to input signals to a particular row or column header, a pivot handle to reposition a selected layer label associated with the particular row or column header;
dragging, by the computer system and in response input signals to the pivot handle, the selected layer label to a new position;
displaying, by the computer system, the row or column headers associated with the selected layer label at the new position; and
rearranging, by the computer system, the rows and columns of the data table to conform to the new position of the selected layer label and the associated row or column headers.

2. The method of claim 1 wherein the pivot table includes plural nested column headers in an upper or lower edge region of the pivot table, wherein the plural nested column headers are hierarchically arranged in header rows, wherein each header row represents a column layer.

3. The method of claim 1, wherein the pivot table includes plural nested row headers in a leftmost or rightmost edge region of a table, wherein the plural nested row headers are hierarchically arranged in header columns, wherein each header column represents a row layer.

4. The method of claim 1 further including implementing an intersection of a row layer label cell and a column layer label cell as a selection handle to select all contents of the data table of the pivot table.

5. The method of claim 1, further including providing a first user option to selectively enable or disable display of one or more layer columns cells or layer row cells.

6. The method of claim 1, further including automatically adjusting a size of one or more layer column cells or layer row cells when one or more columns or rows of the data table are resized, so as to ensure that contents of a layer column cell or layer row cell remain visible and not clipped.

7. The method of claim 1, further including providing a third user option to add a stamp to one or more layer column cells or layer row cells.

8. The method of claim 1, further including providing a fourth user option to enable or disable display of a hover layer that includes a layer label and a pivot handle in addition to display of persistent layer labels.

9. The method of claim 8, further including providing a fifth user option to scroll a header region to display additional layer labels that may not be initially visible in the data table.

10. An apparatus comprising:
a digital processor coupled to a display and to a processor-readable storage device, wherein the processor-readable storage device includes one or more instructions executable by the digital processor to perform the following acts:
rendering a pivot table, wherein the pivot table includes a data table of rows and columns of data cells and with the data table including a topmost row and a leftmost column;
rendering one or more column header rows at a top edge of the data table with a first column header row located adjacent to the topmost row of the data table;
rendering one or more row header columns at a left edge of the data table with a first row header column located adjacent to the leftmost column of the data table, wherein the one or more column header rows and the one or more row header columns are associated with one or more layers;
enabling, in response to label display enable input signals to a hide layer label user interface, persistent display of layer labels,
persistently displaying, in response to label display enable input signals, a layer label column, wherein the layer label column includes layer column cells, displaced horizontally left of and adjacent to an associated column header row, wherein a layer column cell identifies a data type of the associated column header row;
persistently displaying, in response to label display enable input signals, a layer label row, wherein the layer label row includes layer row cells, displaced vertically from and adjacent to an associated row header column, wherein a layer row cell identifies a data type of the associated row header column;
enabling, in response to intersection cell enable signals from a user interface, display of an intersection cell;
persistently displaying, in response to intersection cell enable signals, a single intersection cell that is the both the layer column cell displaced left of and adjacent to the first column header row and the layer row cell displaced vertically from and adjacent to the first row header column, where the intersection cell includes a first section that identifies the data type of the first column header row and a second section that identifies the data type of the first row header column;
displaying, when no intersection enable signal is received from the user interface, a layer label row having blank cells displaced vertically from and adjacent to the topmost row and a layer label column having blank cells displaced horizontally left of and adjacent to the leftmost column;
enabling, in response selection of a blank cell, data cell selection functionality;
creating, in response to input signals to a particular row or column header, a pivot handle to reposition a selected layer label associated with the particular row or column header;
dragging, in response input signals to the pivot handle, the selected layer label to a new position;
displaying the row or column headers associated with the selected layer label at the new position; and
rearranging the rows and columns of the data table to conform to the new position of the selected layer label and the associated row or column headers.

11. A non-transitory processor-readable storage device including instructions executable by a digital processor, the processor-readable storage device including one or more instructions for:
rendering a pivot table, wherein the pivot table includes a data table of rows and columns of data cells and with the data table including a topmost row and a leftmost column;
rendering one or more column header rows at a top edge of the data table with a first column header row located adjacent to the topmost row of the data table;
rendering one or more row header columns at a left edge of the data table with a first row header column located adjacent to the leftmost column of the data table, wherein the one or more column header rows and the one or more row header columns are associated with one or more layers;
enabling, in response to label display enable input signals to a hide layer label user interface, persistent display of layer labels,
persistently displaying, in response to label display enable input signals, a layer label column, wherein the layer label column includes layer column cells, displaced horizontally left of and adjacent to an associated column header row, wherein a layer column cell identifies a data type of the associated column header row;
persistently displaying, in response to label display enable input signals, a layer label row, wherein the layer label row includes layer row cells, displaced vertically from and adjacent to an associated row header column, wherein a layer row cell identifies a data type of the associated row header column;
enabling, in response to intersection cell enable signals received from a user interface, display of an intersection cell;
persistently displaying, in response to intersection cell enable signals, a single intersection cell that is the both the layer column cell displaced left of and adjacent to the first column header row and the layer row cell displaced vertically from and adjacent to the first row header column, where the intersection cell includes a first section that identifies the data type of the first column header row and a second section that identifies the data type of the first row header column;
displaying, when no intersection enable signal is received from the user interface, a layer label row having blank cells displaced vertically from and adjacent to the topmost row and a layer label column having blank cells displaced horizontally left of and adjacent to the leftmost column;
enabling, in response selection of a blank cell, data cell selection functionality;
creating, in response to input signals to a particular row or column header, a pivot handle to reposition a selected layer label associated with the particular row or column header;

dragging, in response input signals to the pivot handle, the selected layer label to a new position;

displaying the row or column headers associated with the selected layer label at the new position; and rearranging the rows and columns of the data table to conform to the new position of the selected layer label and the associated row or column headers.

\* \* \* \* \*